US012678754B2

(12) United States Patent
Bessler et al.

(10) Patent No.: US 12,678,754 B2
(45) Date of Patent: Jul. 14, 2026

(54) DEVICE AND METHOD FOR MONITORING A MIXING PROCESS

(71) Applicant: VIVONIC GMBH, Sailauf (DE)

(72) Inventors: Patrick Bessler, Erlenbach (DE); Andreas Hemm, Alzenau (DE); Stefan Eberlein, Höchberg (DE)

(73) Assignee: VIVONIC GMBH, Sailauf (DE)

( * ) Notice: Subject to any disclaimer, the term of this patent is extended or adjusted under 35 U.S.C. 154(b) by 488 days.

(21) Appl. No.: 18/264,601

(22) PCT Filed: Feb. 7, 2022

(86) PCT No.: PCT/EP2022/052876
§ 371 (c)(1),
(2) Date: Aug. 8, 2023

(87) PCT Pub. No.: WO2022/171568
PCT Pub. Date: Aug. 18, 2022

(65) Prior Publication Data

US 2024/0109046 A1 Apr. 4, 2024

(30) Foreign Application Priority Data

Feb. 10, 2021 (DE) ..................... 10 2021 103 141.9

(51) Int. Cl.
*B01F 35/00* (2022.01)
*B01F 23/40* (2022.01)
(Continued)

(52) U.S. Cl.
CPC ........ *B01F 35/2202* (2022.01); *B01F 23/483* (2022.01); *B01F 23/49* (2022.01); *B01F 35/213* (2022.01); *B01F 2101/22* (2022.01)

(58) Field of Classification Search
CPC .. B01F 35/2202; B01F 23/483; B01F 35/213; B01F 2101/22
See application file for complete search history.

(56) References Cited

U.S. PATENT DOCUMENTS

2009/0147617 A1 6/2009 Baumfalk et al.
2011/0004344 A1 1/2011 Pinton et al.
(Continued)

FOREIGN PATENT DOCUMENTS

DE 19809945 9/1999
DE 102010055781 6/2012
(Continued)

OTHER PUBLICATIONS

Rechberger A, Amsüss R, Rossegger S, Breidler R, Steiner G. High Precision Vibration-Type Densitometers Based on Pulsed Excitation Measurements. Sensors (Basel). Apr. 5, 2019;19(7):1627. doi: 10.3390/s19071627. PMID: 30959734; PMCID: PMC6479486. (Year: 2019).*
(Continued)

*Primary Examiner* — Anshu Bhatia
(74) *Attorney, Agent, or Firm* — Kilyk & Bowersox, P.L.L.C.

(57) ABSTRACT

The present invention relates to a device for preparing a medical solution by mixing at least one liquid and at least one concentrate raw material, comprising a mixing container into which the at least one liquid and the at least one concentrate raw material can be fed, a control device, and a measuring device for measuring at least one parameter, preferably a density, of a mixture produced by means of the device during the mixing operation, and a corresponding method.

15 Claims, 7 Drawing Sheets

(51) Int. Cl.

| | |
|---|---|
| ***B01F 35/213*** | (2022.01) |
| ***B01F 35/22*** | (2022.01) |
| *B01F 101/22* | (2022.01) |

(56) References Cited

U.S. PATENT DOCUMENTS

| | | | | |
|---|---|---|---|---|
| 2019/0015800 | A1* | 1/2019 | Jansson ................ | G05D 11/138 |
| 2020/0360587 | A1 | 11/2020 | Bebler et al. | |
| 2023/0054856 | A1 | 2/2023 | Berg et al. | |

FOREIGN PATENT DOCUMENTS

| | | | |
|---|---|---|---|
| DE | 102019126086 | | 4/2021 |
| JP | 2008116402 | A | 5/2008 |
| JP | 2011038810 | A | 2/2011 |
| JP | 2023508923 | A | 3/2023 |

OTHER PUBLICATIONS

Office Action issued in corresponding Japanese Patent AppIn 2023-572053 dated Dec. 1, 2025 (9 pages).

* cited by examiner

DEVICE AND METHOD FOR MONITORING A MIXING PROCESS

The present invention relates to a device and a method for monitoring a mixing operation for preparing a medical solution by mixing at least one liquid and at least one concentrate raw material.

In many medical applications, solutions are used which must be treated before use in order to comply to strict quality standards, for example with regard to the composition of the solutions. In extracorporeal blood treatment, in particular dialysis, for example, dialysate is used which is produced by a blood treatment machine from a preferably liquid dialysate concentrate. The dialysate and the dialysis concentrate each constitute a medical solution. The dialysate concentrate is often produced by mixing at least one liquid, for example dialysis water, and at least one concentrate raw material.

Concentrate raw materials, which may for example be present in liquid, solid, powder, paste or slurry form, are often mixed with appropriately treated water, for example pure water, ultrapure water, dialysis water or permeate from a reverse osmosis system, to produce a medical solution that can for example be used in the context of extracorporeal blood treatment, in particular dialysis.

Conventionally, the mixing operation of a concentrate raw material with a liquid takes place according to a fixed predetermined scheme, for example by always carrying out the mixing operation for a predetermined time span, e.g. 70 minutes. During the mixing operation of the at least one concentrate raw material and the at least one liquid, a mixture is initially formed in which the concentrate raw material is present in the liquid partially dissolved, partially undissolved. Such a mixture thus preferably forms an intermediate product of the mixing operation between an initial state, in which the concentrate raw material and the liquid are present separately, or the concentrate raw material is present undissolved in the liquid, and a final state in which the concentrate raw material is dissolved in the liquid and a desired medical solution is present. For example, when the target specifications for a desired medical solution are reached, the designation of the product of the mixing operation thus changes from mixture (intermediate stage, does not yet meet the target specifications) to medical solution (final product, meets the target specifications).

After this predetermined time span has elapsed, a quality control of the mixture produced usually takes place manually, for example by means of a density measurement or a laboratory analytical measurement.

If the mixture does not meet the target specifications or a desired medical solution, the mixture usually has to be discarded, wasting resources. Continuation of the mixing process until the optimum mixing result or a desired medical solution is achieved is often not possible.

Furthermore, in many cases a shorter mixing operation would also be sufficient to obtain the desired mixture. The presetting of fixed specifications for the time duration of the mixing operation thus results in an unnecessary expenditure of time in these cases and energy is wasted. In particular, in cases where it is not possible to continue a mixing process after the predetermined time duration has elapsed, it is precisely a particularly long time duration with a large security buffer that is set—e.g. to avoid wasting resources. This routinely wastes a lot of time and energy.

Against this background, the object underlying the present invention is to mitigate or even completely eliminate the problems of the prior art. In particular, the object underlying the present invention is to optimize the generation of a medical solution by a mixing operation and to avoid unnecessary waste of resources.

This object is achieved by a device and a method with the features of the independent claims. Advantageous further developments of the invention are the subject-matter of the subclaims.

A first aspect of the invention relates to a device for preparing a medical solution by mixing at least one liquid and at least one concentrate raw material, comprising a mixing container into which the at least one liquid and the at least one concentrate raw material can be fed, a control device, and a measuring device for measuring at least one parameter, preferably a density, of a mixture produced by means of the device during the mixing operation.

In other words, the produced mixture is preferably already monitored during the ongoing mixing operation, for example by means of a density measurement. In this way, the progress of the mixing operation can be monitored continuously, preferably in real time or almost in real time, and the mixing operation can be flexibly adjusted as required. The density as a parameter of the product of the mixing operation, i.e. the medical solution, can for example be considered as an indicator for e.g. the quality of the mixture.

In principle, it would also be conceivable, as an alternative or in addition to the measurement of the density, to monitor one or more further parameters which reflect a quality of the mixture of the concentrate raw material and the liquid and/or a progress of the mixing operation, for example, the conductivity, an optical transmittance of the mixture, etc.

The medical solution produced by means of the device can be a medical solution that is used directly (for example, in the case of renal replacement therapy by means of dialysis—dialysis fluid, also called dialysate) or form an intermediate stage in the production of such a solution (for example, a liquid concentrate, which—in the case of renal replacement therapy by means of dialysis—is also called dialysis concentrate or dialysate concentrate).

Preferably, the measuring device is configured to carry out measurements continuously and/or online during a mixing operation carried out by means of the device.

In this context, a measuring device measuring online preferably means that the measuring device is linked into the ongoing operation of a device, e.g. a mixing device or metering unit, and, for example, records measurement data during the operation, in particular during a mixing operation. Furthermore or alternatively, an online measuring device is "online" in the sense that the measuring device is connected to further data-processing devices, so that the measuring device can always be controlled or exchange data, for example.

According to an advantageous embodiment, the control device is configured to control or regulate the operation of the device, in particular a mixing operation carried out by said device, on the basis of the parameter values determined by means of the measuring device, for example the measured density of the mixture.

In an exemplary case, this is effected by comparing measured values with previously defined target values and/or limit values or error limits. Alternatively or additionally, parameter values for any section of the past (for example, from the last week, the last month, or the last year) can be used for the control and/or predictions (changing demand, other concentrate raw materials or solutions used for the future, predictable completion of the mixing operation) can be taken into account.

Furthermore, the control device can be configured to analyze the dynamics of the mixing operation on the basis of the parameter values determined by means of the measuring device, preferably during an ongoing mixing operation or retrospectively on the basis of historical data of one mixing operation or multiple mixing operations, for example by determining rates of a dissolving process and/or mixing operation, for example by determining a slope of a dissolving curve, detecting the change of certain parameters and/or determining the progress of the dissolving process by forming an integral of a dissolving curve.

The adjustment or control of the mixing operation preferably takes place during an ongoing mixing operation, so that the mixing operation can be flexibly adjusted in such a way that the solution produced meets the target specifications. In this way, unnecessary waste of resources can be prevented, because the end of a preset mixing operation is not waited for before checking whether this mixing operation results in a desired solution.

Furthermore, it has been found to be advantageous in practice that the control device is configured to compare the parameter values measured by the measuring device with a setpoint value and, when the setpoint value or a tolerance range surrounding it is reached, to terminate the ongoing mixing operation and/or to issue an output to a user.

The output can take place visually and/or acoustically, for example by a signal lamp or a loudspeaker. Alternatively or additionally, a message can also be displayed on a display unit, or a message can be sent to an external terminal device, such as a smartphone or tablet. Further alternatively or additionally, the output to a user may be effected via a clinic IT system or clinic master display implemented in hardware and/or software, and the message may be issued to a local computer or server or a remotely located server.

For example, a solution with the desired parameters may already have been produced after 20 minutes of mixing (e.g. due to different ambient or input conditions), although 50 minutes are usually required for this. In this case, it can be detected by means of a device according to the invention that the desired solution has already been produced after 20 minutes and the mixing operation can be terminated. This saves 30 minutes of unnecessary mixing.

Alternatively or additionally, an output can be made to a user that the produced mixture has reached the setpoint value or a tolerance range surrounding it. The user can then terminate the mixing operation by means of an input. It can also be provided to inform the user about a predicted end of the mixing operation.

Furthermore, it has proven advantageous in practice that the control device is configured to operate the device for a first predetermined time span to carry out a mixing operation and, after expiry of and/or during the predetermined first time span, to compare the parameter values measured by the measuring device with a setpoint value and, if the setpoint value or a tolerance range surrounding it is not reached, to prolong the mixing operation once or multiple times by a second predetermined time span and/or to issue an output to a user, with which the user is preferably requested to approve or instruct the prolongation of the mixing operation. Alternatively, the user can also input for the mixture to not reach the predefined setpoint value or tolerance range, but to be used nonetheless.

Here, the second time span for prolonging the mixing operation can be set to any value, for example between 10 minutes and 4 hours, and the prolongation of the mixing operation can be prolonged once or multiple times by the same or different time spans. A maximum time span for the mixing operation may be provided, which the mixing operation cannot exceed, despite a single or multiple prolongation.

Provision may be made that without user input, an automatic prolongation of the mixing operation by a specific second time span is effected.

It would also be conceivable for the control device to be configured for adaptive mixing time extension and, preferably on the basis of a time course of the parameter values determined by means of the measuring device, to suggest a specific length of the second time span by which the mixing operation would have to be prolonged in order to achieve a specific target specification. In other words, an ongoing mixing operation is automatically optimized by means of a device according to the invention and/or with a user interaction based on parameters of the mixture. According to one aspect, an adaptive prediction of the mixing time extension is effected and output to a user. In a further development or alternative, the adjustment to the prediction is suggested to the user, who can confirm or reject. In yet another further development or alternative, the device autonomously carries out an adjustment to the mixing time according to the prediction without approval or input. Nevertheless, the adaptation may optionally be indicated. In yet another further development, the adaptive adjustment to the prediction is carried out continuously throughout the mixing operation, thereby enabling tailored optimization using current values. In all of the aforementioned aspects, additionally a documentation of the measured values and the predicted values may be provided in a local or cloud-based storage location, in an electronic logbook and/or a master display. In accordance with one aspect of the above variants, historical knowledge from historical time trends may be used, e.g., that shorter or longer durations typically occur at certain seasons. Additionally or alternatively, this also applies to daily patterns, weekly patterns, monthly patterns.

Alternatively or in addition to the time span of execution, other parameters of the mixing operation can be optimized on the basis of the measured values, for example, the storage, a preheating (e.g. of the permeate) or a pre-dosing of the starting materials or the like.

A further embodiment of the invention relates to a device in which the control device is configured to discard a mixture produced by means of the device and/or to issue an output to a user that the mixture produced is to be discarded, if the parameter values measured by the measuring device do not reach a setpoint value or a tolerance range surrounding it after a time span for carrying out a mixing operation has elapsed, and/or if a time course of the measured parameter values does not or not sufficiently approach or deviate from the setpoint value or the tolerance range during a predetermined time interval during the mixing operation.

Within the scope of the present invention, a measuring device based on the flexural resonator principle is preferably used, preferably continuously flown-through by the mixture or solution produced by means of the device. The flexural resonator system may comprise a U-shaped or a W-shaped measuring tube.

Alternatively or additionally, the measuring device may be or include a device for measuring density on the basis of a selective ion concentration, a device for measuring density by means of a volumetric measuring chamber and or mass measurement, a device for measuring density by means of ultrasound or gamma rays, a device for measuring density by means of the Coriolis principle and/or a device for optical density measurement or for density measurement by means of refraction. For example, a (mass) density can be detected on the basis of one or more of selective ion concentration and ion density.

The measured density values of a dialysate concentrate, which is an example of a medical solution according to an aspect of the present technical solution, typically range from 1.14-1.22 g/cm$^3$ at 25° C. The liquid used for mixing, e.g., pure water, dialysis water, or pure water obtained by reverse osmosis, also referred to as reverse osmosis permeate, has a density lower than 1. For example, density measuring values at the beginning of the mixing operation thus range from 0.99 to 1 g/cm$^3$.

For example, in a first exemplary medical solution—e.g., a dialysate concentrate, the minimum allowable density for a finished solution—that is, at the end of the mixing operation—is 1.197 g/cm$^3$, the target value for a finished dialysate concentrate is 1.200 g/cm$^3$, and the maximum allowable density of a finished dialysate concentrate is 1.203 g/cm$^3$.

For example, in a second exemplary solution, also for example a dialysate concentrate, the minimum allowable density for a finished solution is 1.195 g/cm$^3$, the target value is 1.198 g/cm$^3$, and the maximum allowable density is 1.201 g/cm$^3$—in each case exemplary for a final mixed solution at the end of a successful mixing operation.

Furthermore, the control device can be configured to electronically document the parameter values determined by means of the measuring device and preferably their time histories, preferably to file them in an electronic logbook and/or to transmit them to another device, preferably to a master display.

For example, the execution of a mixing operation (time, duration, solutions to be produced, starting materials used, e.g. dialysis water and concentrate raw material(s), etc.) and preferably also the measured values determined during the process are automatically documented/recorded in a logbook, wherein the recording may comprise data transmission by means of a remote connection.

The digital logbook may be recorded locally in a mixing device, in the near data environment (e.g., in the control center of a clinic), or remotely (e.g., on a server or in a data cloud). The record may include the time of execution of the procedure, the duration, and the determined density values of the mixture, as well as other data.

Preferably, the digital logbook can be accessed remotely, for example by service technicians.

For example, at the end of each mixing operation, data concerning the mixing operation can be stored automatically. Also, during a mixing operation at predetermined time intervals, the determined parameter values can be stored and/or whether these parameter values correspond to an objective. The stored data and/or parameter values can preferably be further analyzed to detect trends. For example, in the context of predictive maintenance of the device, changes in the device and/or individual components thereof, e.g., sensors, valves, etc., can be detected. Repairs, the replacement of components or recalibrations of an actual malfunction could for example be carried out in advance in a targeted manner to ensure smooth operation of the device.

Basically, a device according to the invention only requires a mixing container in which the at least one liquid and at least one concentrate raw material can be mixed.

Preferably, a device according to the invention further comprises a container for receiving and/or storing the produced mixture and/or the produced medical solution, and/or a container for stocking at least one other raw material for producing the medical solution.

Multiple different medical solutions, e.g. dialysate concentrates, can be produced. For each type, a device according to the invention preferably comprises two redundant containers for storing the finished solution, so that it is ensured that sufficient solution of this type is always available. In practice, between one and three types are used.

A device according to the invention preferably further comprises at least one pump for delivering raw materials to produce the medical solution, and valves for controlling or regulating the flow of the raw materials.

In principle, it would also be conceivable for a device according to the invention to additionally have a labeling means for labeling a container with medical solution produced by means of the device, for which it has been detected by means of the measuring device that it meets the target specifications and/or those of which a user has approved.

The labeling device can for example be a printer that prints a label with data relating to the medical solution, which label can then be applied onto a container of the medical solution. Alternatively, the data can be printed directly onto the container.

Another aspect of the invention relates to a method for monitoring a mixing operation for preparing a medical solution by mixing at least one liquid and at least one concentrate raw material, wherein the mixing operation is preferably carried out by means of a device according to the invention, comprising the step of: measuring a parameter, preferably a density, of a mixture produced by means of the device during the mixing operation, preferably by means of a measuring device associated with the device carrying out the mixing operation.

In a method according to the invention, the measurement of the parameter is preferably carried out continuously and/or online.

A method according to the invention preferably comprises the step of: controlling or regulating the operation of the device, in particular a mixing operation carried out by the device, on the basis of the parameter values determined by means of the measuring device.

A method according to the invention may have the features and steps described above in the context of a device according to the invention in any combination, which are not reproduced here to avoid redundancy.

Further advantages, features and effects of the present invention result from the following description of preferred embodiments with reference to the Figures, in which the same reference characters indicate identical or similar components or method steps. Shown are in:

FIG. 1 a flow chart of a method according to the invention;

FIG. 2 a flow chart of another method according to the invention;

FIG. 3 a flow chart of yet another method according to the invention;

FIG. 4 a flow chart of another method according to the invention;

FIG. 5 a flow chart of still yet another method according to the invention;

FIG. 6 a flow chart of yet another method according to the invention; and

FIG. 7 a device according to the invention.

As shown in FIG. 1, a mixing operation of at least one concentrate raw material and at least one liquid or solvent is started in step S1. Thereafter, in a generally optional step S2, the function of the measuring device, in this case a density sensor, is checked, for example using a reference liquid or permeate.

Optionally, a predetermined time span, e.g. 10 minutes, can then be waited in step S3 before starting the preferably continuous measurement of the density of the produced mixture during the mixing operation in step S4. With the waiting period in step S3, it can be avoided, for example, that measurements are made at a time when the mixture most likely does not meet the target specifications. In addition, it avoids measurement inaccuracies at the beginning of the mixing operation.

The measurement in step S4 takes place continuously during the mixing operation, which means that the mixing operation can be monitored particularly accurately and without gaps.

In step S5, it is checked whether the measured values from step S4 correspond to a setpoint value, i.e. whether a target density has been reached. If this is the case, a notification is sent to a user in step S6 and the produced mixture is transferred to a stocking system, for example a barrel or tank, in step S7.

An optional additional waiting time of, for example, 10 minutes may be provided between steps S5 and S6 to avoid operating at the absolute minimum target density. If such an additional waiting time is provided, the density of the mixture is expected to continue to increase beyond the achieved minimum target density during a proper mixing operation.

Then, in step S8, it is waited whether the notified user approves the mixture or the medical solution. If this is the case, the medical solution is approved and used for its final application in step S9.

If it is detected in step S5 that the measured values from step S4 do not correspond to the setpoint value, the mixing operation is continued in step S10 until a predetermined time span, for example 70 minutes, has elapsed.

Within this predetermined time span, steps S4 and S5 may be carried out regularly at predetermined intervals to check whether the entire 70 minutes of mixing are actually required for obtaining a desired medical solution or its parameter target values or target value ranges.

The time span at step 10 can be different for the first cycle through the loop with steps S4, S5 and S10 than for the second, third, each further cycle and can be, for example, 70 minutes for the first cycle and 30 minutes for each further cycle. The values mentioned are examples, arbitrary other values are conceivable.

After the predetermined time span of step S10 has elapsed, the system optionally waits for a user input in step S11 for a certain time span, e.g. 10 minutes. The length of this time span can be set as desired.

If a corresponding user input is made or if no input is made, it is decided in step S12 as to whether the mixing operation is to be continued for a second predetermined time span. The mixing operation can be automatically prolonged if there is no user input. The predetermined time span is e.g. 30 minutes.

If it is decided in step S12 that the mixing operation should be continued, the density is then measured again according to step S4. If it is decided in step S12 that the mixing operation is not to be continued, the mixture is either transferred to the stocking system for manual sampling according to step S13 or discarded according to step S15.

An optional request for approval by a user may be interposed between steps S12 and S13. For example, if a user decides in step S12 that mixing should not be prolonged, or a predetermined maximum time span of execution of the mixing operation or maximum number of prolongations is reached and/or the control device of the device decides that mixing should not be prolonged, then a request can be issued to the user whether the mixture or the medical solution, i.e. the contents of the receiver tank (also referred to as mixing tank) should be transferred to a stocking device or not.

If the manual sampling in step S14 shows that the mixture meets the target specifications, the process proceeds according to step S8. If the mixture does not meet the target specifications, it is discarded in step S15.

As a final step, the mixing device is rinsed with permeate or another suitable rinsing liquid in step S16 and is thus provided for the next mixing operation.

Alternatively, step S16 can occur prior to or partially simultaneously with step S15.

Figure 1:
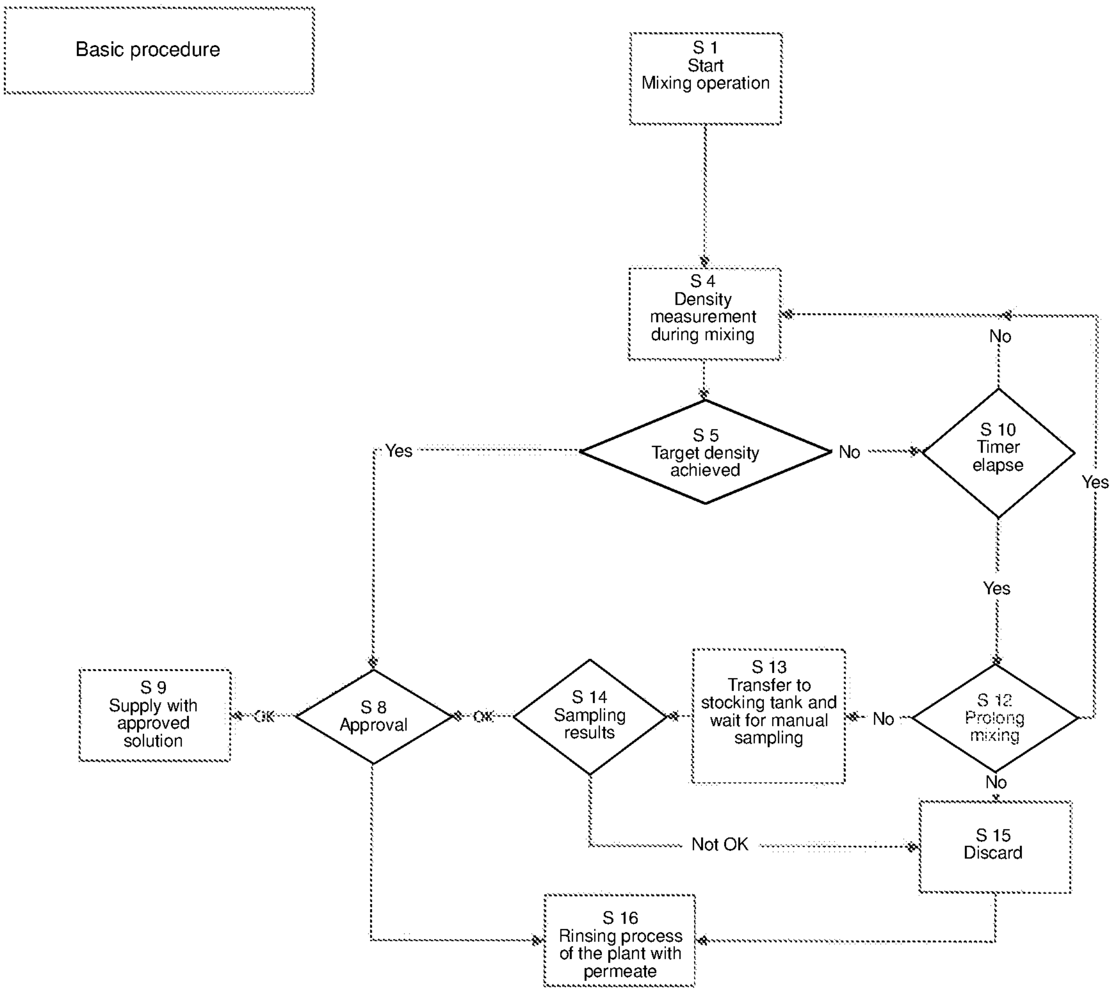
Figure 2:
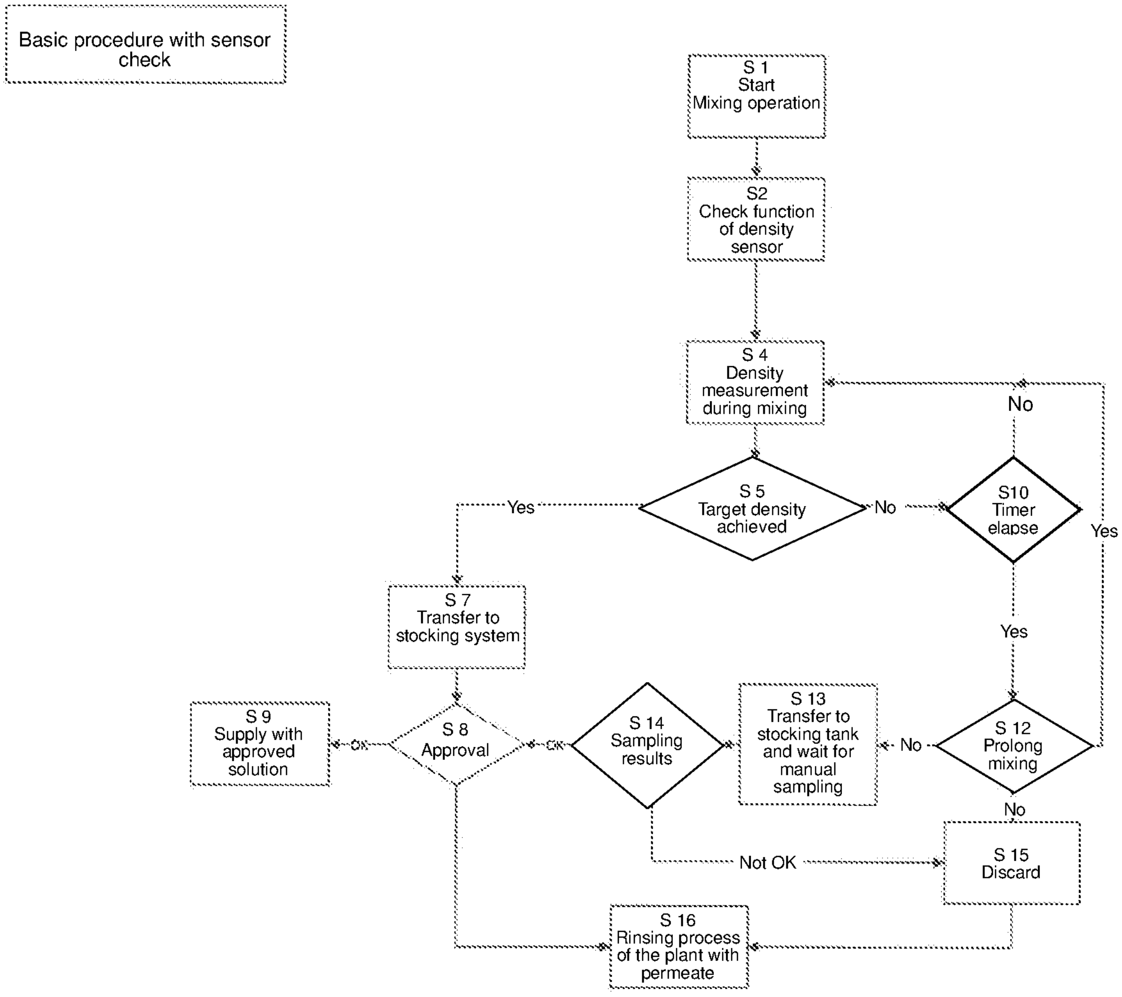
FIG. 2 shows a flow chart of a method according to the invention, which is reduced in the number of method steps compared to the method in FIG. 1.
Figure 3:
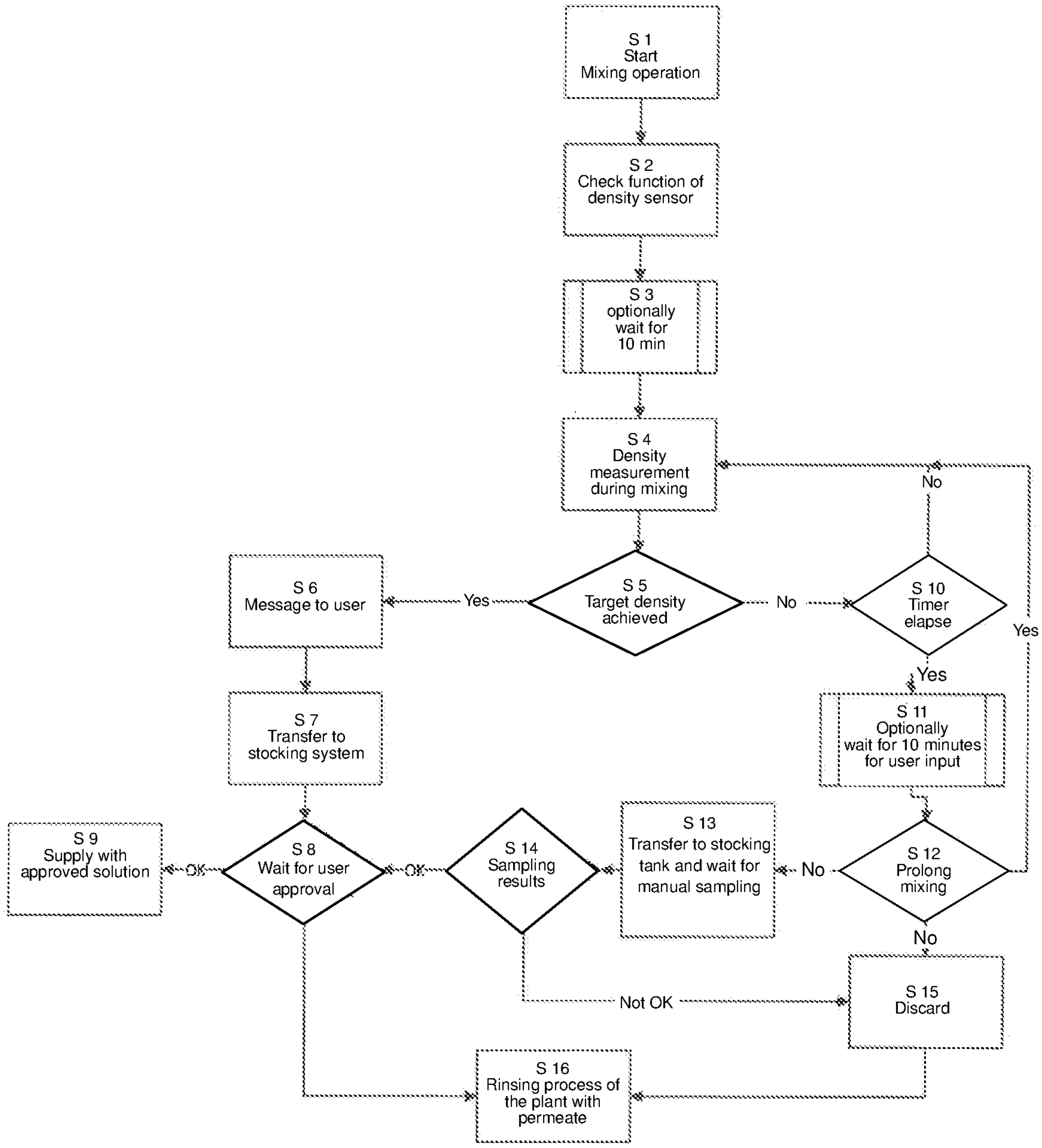
FIG. 3 shows a flow chart of a method according to the invention, which is based on the method according to FIG. 2, but additionally includes step S2.
Figure 4:
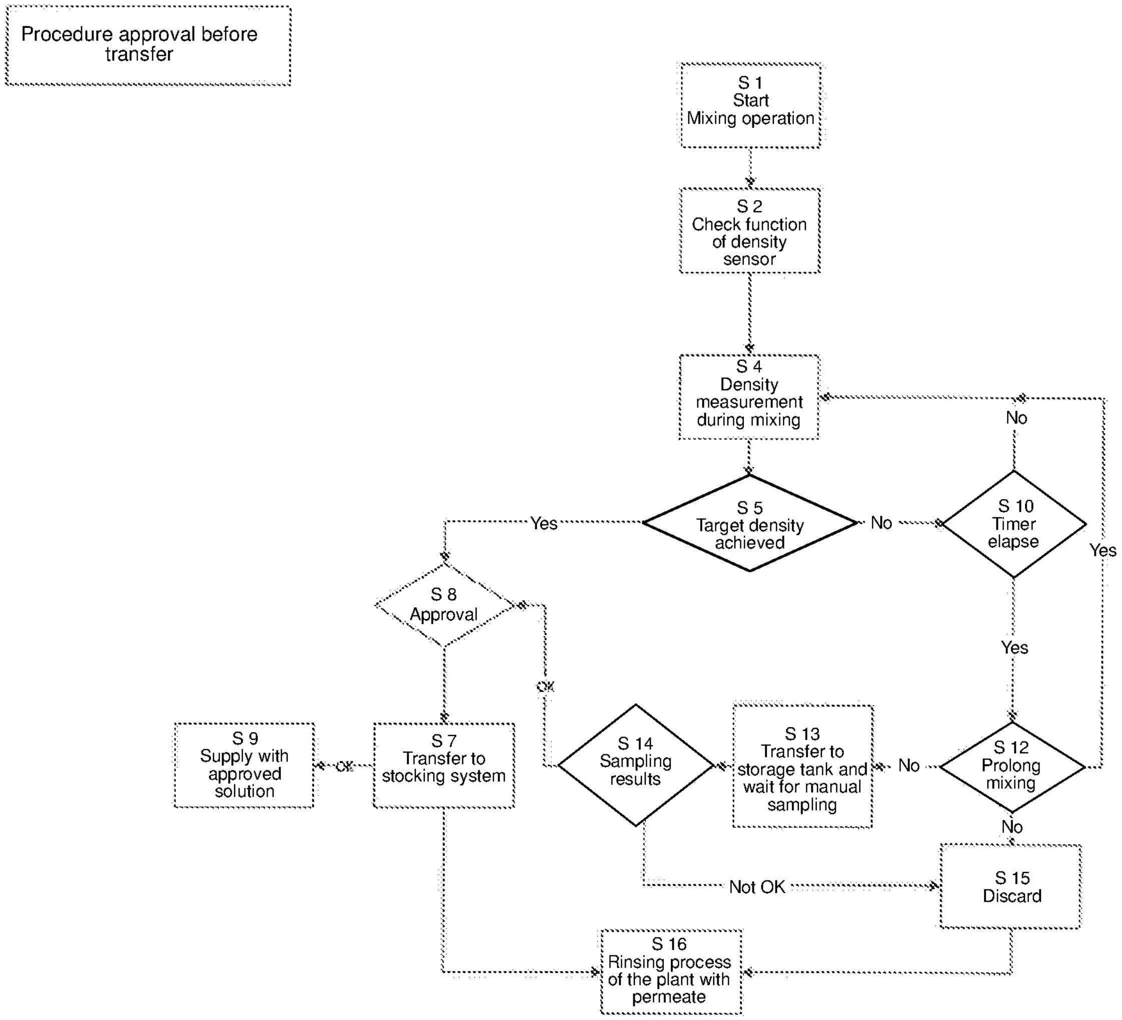

As can be seen from the flow chart shown in FIG. 4, after a target density has been determined in step S5, the approval of a user can first be waited for in step S8 before the mixture or the medical solution is transferred to the stocking device in step S7 if the approval has occurred. Alternatively, in step S8, the approval may occur automatically, for example by a device according to the invention, if it has been detected in step S5 that the mixture corresponds to the target medical solution. In other words, for example, if the mixture meets the target specifications, i.e. is the desired medical solution, the mixture is approved.

Figure 5:
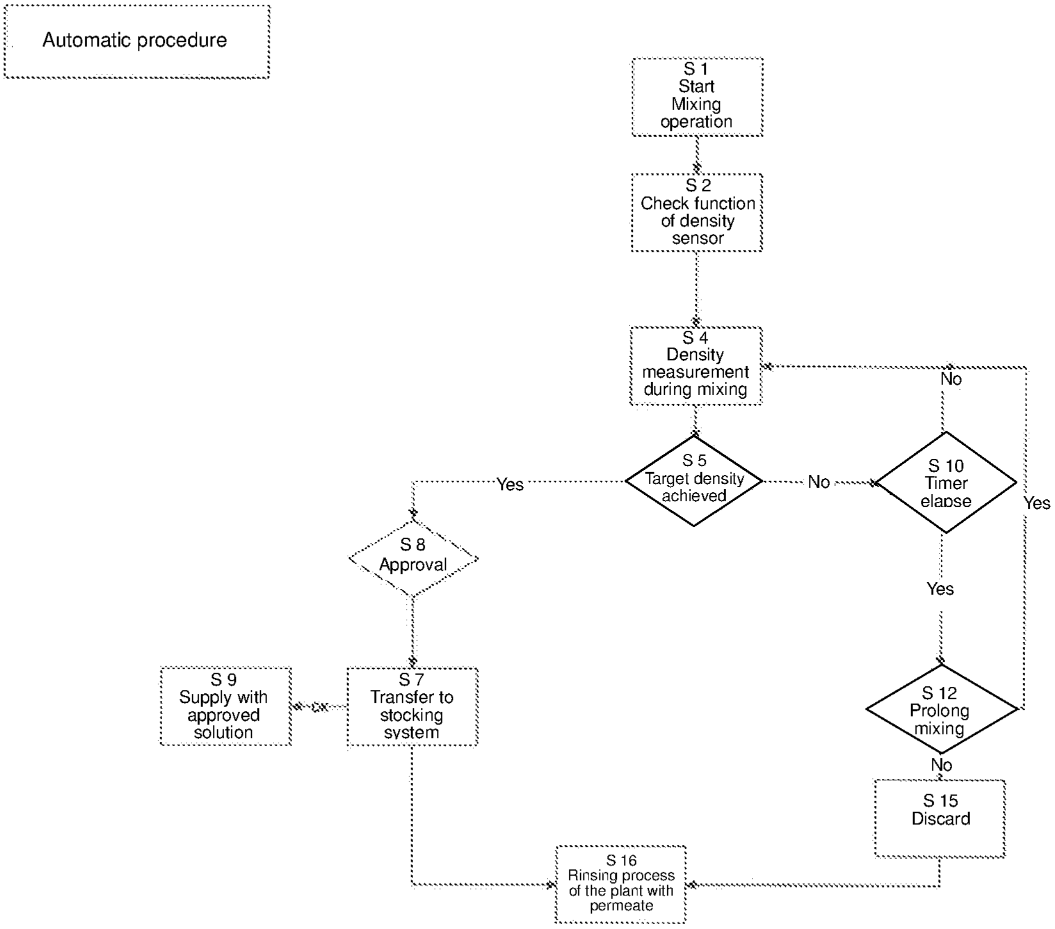

As shown in FIG. 5, a method according to the invention can be executed automatically without requiring user input. For example, in this embodiment, if it has been detected in step S5 that the target density has not been achieved and it has been detected in step S10 that the first time span of the mixing operation, in this example 70 minutes, has elapsed, the mixing operation may be automatically prolonged in step S12 once or multiple times by a predetermined second time span until either the target density has been reached or, for example, due to the expiration of a certain maximum time span, the mixture is discarded in step S15. In other words, for example, if the mixture does not meet the target specifications, i.e. does not correspond to the desired medical solution, the mixture is discarded.

Figure 6:
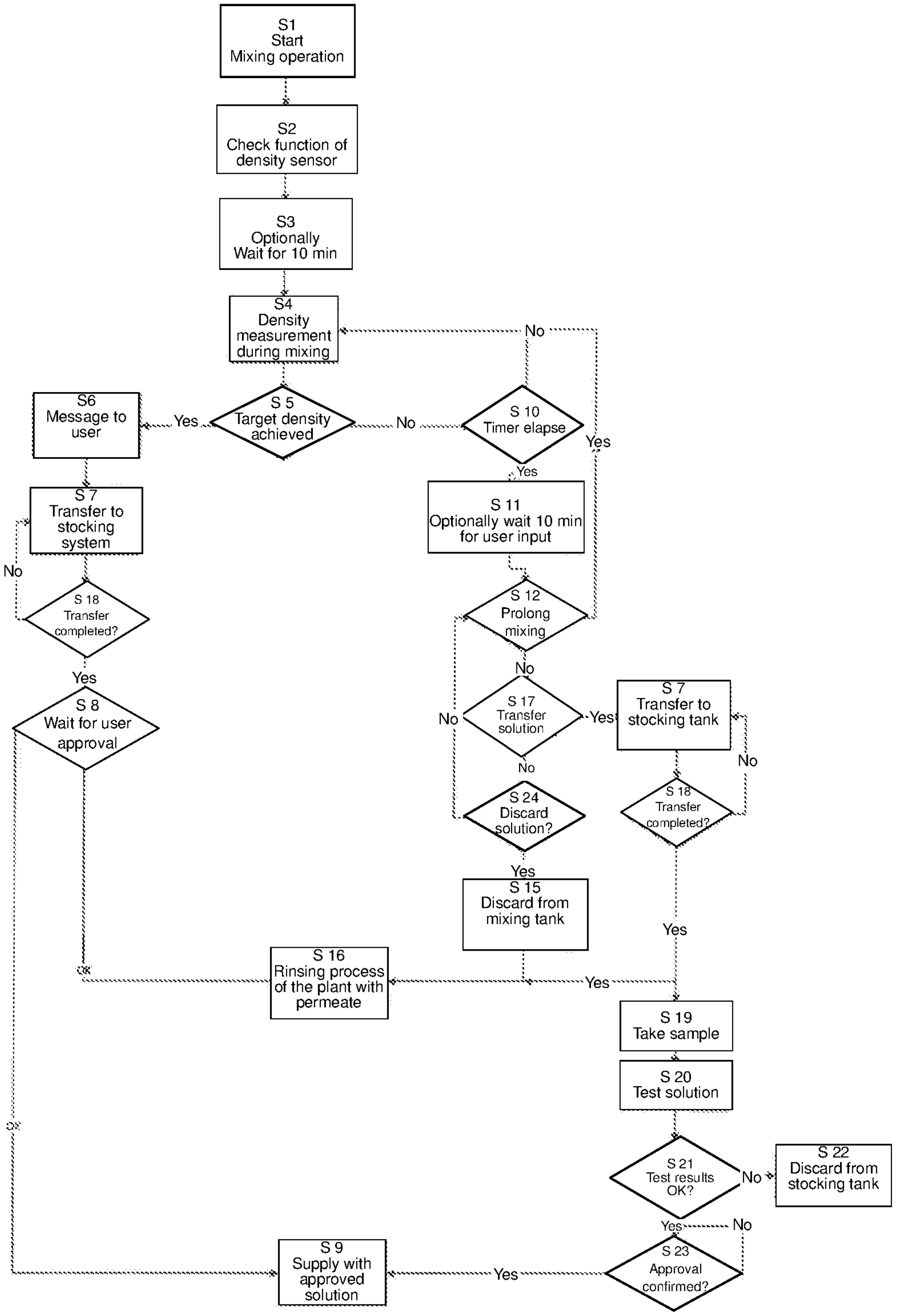

FIG. 6 shows a flow chart of a further method according to the invention. In this embodiment, between step S7, in which the mixture is supplied to the stocking device because the mixture corresponds to the desired medical solution, and step S8, in which an approval of the mixture by the user is waited for, a step S18 is provided, in which it is detected whether the mixture or the medical solution has been completely supplied to the stocking device and the transfer to the stocking device has thus ended.

After a positive user approval in step S8, the mixture or the medical solution is fed to its application, e.g. as dialysate concentrate. In addition, the device is rinsed with permeate or another liquid in step S16.

In addition, in this embodiment, after a decision has been made in step S12 against prolongation of the mixing operation, a decision is made in step S17 as to whether the mixture should be transferred to the stocking system. If a positive decision is made in step S17, the mixture is transferred to the stocking system in step S7, and a check is made in step S18 to determine whether the transfer has ended.

If a negative decision is made in step S17, a decision is made in step S24 as to whether the mixture should be discarded. If it is decided that the mixture should not be discarded, the method proceeds to step S12. If it is decided in step S24 that the mixture should be discarded, it is discarded in step S15.

After step S15 or S18, a sample of the mixture is taken according to step S19 and tested in step S20 (for example with an alternative measuring device), for example by a manual density measurement. In step S21, it is determined whether the measured values determined in step S20 correspond to a target specification.

If it is determined in step S21 that the measured values determined in step S20 do not meet the target, the mixture from the stocking system is discarded in step S22.

If it is determined in step S21 that the measured values determined in step S20 correspond to the target specification, a user is requested in step S23 to confirm the approval of the mixture. Only if the confirmation is positive is the mixture supplied to its final intended use as a medical solution; if no approval is given, the user waits for one.

Thus, the measurement and evaluation in steps S19-S21 and the approval in step S23 provide an additional level of safety before the mixture is released from the stocking system for its final use.

Figure 7:
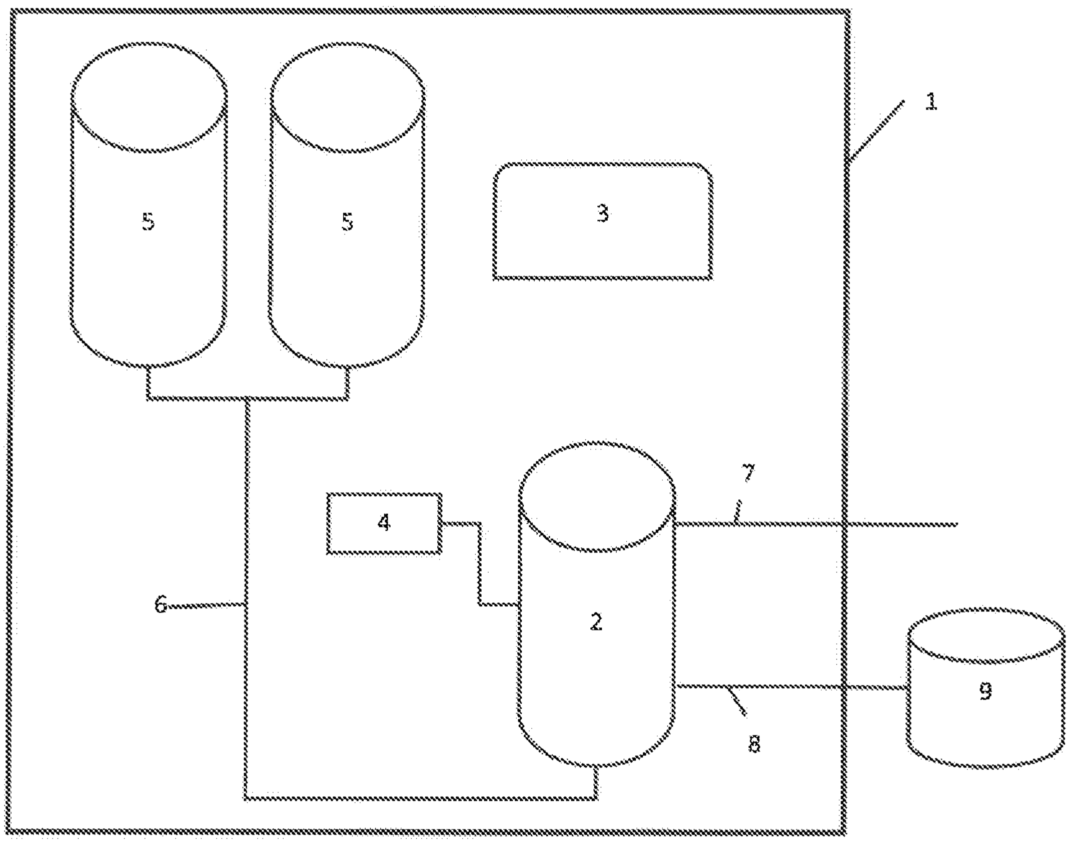

FIG. 7 shows a device 1 according to the invention for preparing a medical solution by mixing at least one liquid and at least one concentrate raw material by means of an arbitrary mixing operation with or in a mixing container 2, into which the at least one liquid and the at least one concentrate raw material can be fed, a control device 3 and a measuring device 4 for measuring at least one parameter, preferably the density, of a mixture produced by means of the device 1 during the mixing operation. The device 1 preferably has two containers 5, which contain the same produced medical solution and stock it redundantly and are connected to the mixing container 2 via a line 6. For example, the containers 5 serve to store the produced dialysate concentrate. Fluid, for example permeate, is supplied to the mixing container 2 via a line 7. The concentrate raw material can be supplied to the mixing container via line 8. Any raw material container with concentrate raw material can be connected to line 8.

The invention claimed is:

1. A device for preparing a dialysate concentrate by mixing at least one liquid and at least one concentrate raw material, by means of or in a mixing container into which the at least one liquid and at least the one concentrate raw material are fed, a control device, and a measuring device for measuring a parameter of a mixture produced by means of the device during a mixing operation, wherein the measuring device is configured to carry out measurements continuously and/or online during the mixing operation carried out by means of the device, wherein the control device is configured to operate the device for a first predetermined time span for carrying out the mixing operation, compare parameter values measured by the measuring device with a setpoint value and, when the setpoint value or a tolerance range surrounding it is reached, to terminate the mixing operation carried out by means of the device and/or to issue an output to a user, and when the setpoint value or a tolerance range surrounding it is not reached by the first predetermined time span, prolong the mixing operation once or multiple times by a second predetermined time span and/or to issue an output to a user, with which the user is requested to approve or instruct the prolongation of the mixing operation and/or to approve the mixture.

2. The device according to claim 1, wherein the control device is configured to control or regulate the operation of the device by carrying out the mixing operation on the basis of the parameter values generated by means of the measuring device and/or on the basis of trend analyses performed by it.

3. The device according to claim 1, wherein the control device is configured to discard a mixture produced by means of the device and/or to issue an output to a user that the produced mixture is to be discarded, when the parameter values measured continuously and/or online by the measuring device do not reach the setpoint value or the tolerance range surrounding it after a time span for carrying out the mixing operation has elapsed, and/or when a time course of the measured parameter values does not or not sufficiently approach or deviate from the setpoint value or the tolerance range during a predetermined time interval during the mixing operation.

4. The device according to claim 1, wherein the measuring device is a flexural resonator through which the mixture produced by means of the device flows continuously.

5. The device according to claim 1, wherein the measuring device is or comprises a device for measuring on the basis of a selective ion concentration, a device for measuring density by means of a volumetric measuring chamber and/or a mass, a device for measuring density by means of ultrasound or gamma rays, a device for measuring density by means of the Coriolis principle and/or a device for optical density measurement or for density measurement by means of refraction.

6. The device according to claim 1, wherein the control device is further configured to electronically document the parameter values determined by means of the measuring device and/or their time histories, to file them in an electronic logbook and/or to transmit them to a further device.

7. The device according to claim 6, wherein the further device is a master display or a central database system.

8. The device according to claim 1, wherein the parameter is a density.

9. A method for monitoring a mixing operation for preparing a dialysate concentrate by mixing at least one liquid and at least one concentrate raw material, wherein the mixing operation is carried out by means of a device, the method comprising steps of:

measuring a parameter of a mixture produced by means of a measuring device associated with the device carrying out the mixing operation, wherein the device is operated for a first predetermined time span for carrying out the mixing operation;

comparing parameter values measured by the measuring device with a setpoint value and, when the setpoint value or a tolerance range surrounding it is reached, terminating a mixing operation carried out by means of the device and/or issuing an output to a user; and prolonging the mixing operation once or multiple times by a second predetermined time span and/or issuing an output to a user, with which the user is requested to approve or instruct the prolongation of the mixing operation and/or to approve the mixture when the setpoint value or a tolerance range surrounding it is not reached by the first predetermined time span.

10. The method according to claim 9, wherein measuring the parameter is carried out continuously and/or online.

11. The method according to claim 10, further comprising: using the parameter values detected by means of the measuring device in the context of a predictive maintenance of the device.

12. The method according to claim 11, wherein the predictive maintenance of the device comprises determining and/or scheduling times for repairs, replacement of components and/or recalibrations.

13. The method according to claim 9, further comprising: controlling or regulating the operation of the device, comprising the mixing operation carried out by said device, on the basis of the parameter values detected by means of the measuring device.

14. The method according to claim 9, wherein the device comprises a mixing container into which the at least one liquid and at least the one concentrate raw material is fed, a control device, and the measuring device for measuring the parameter.

15. The method according to claim 9, wherein the parameter is a density.

* * * * *